May 4, 1937.  E. HAZELL ET AL  2,079,584
RUBBER SHEET MATERIAL
Filed Feb. 29, 1936
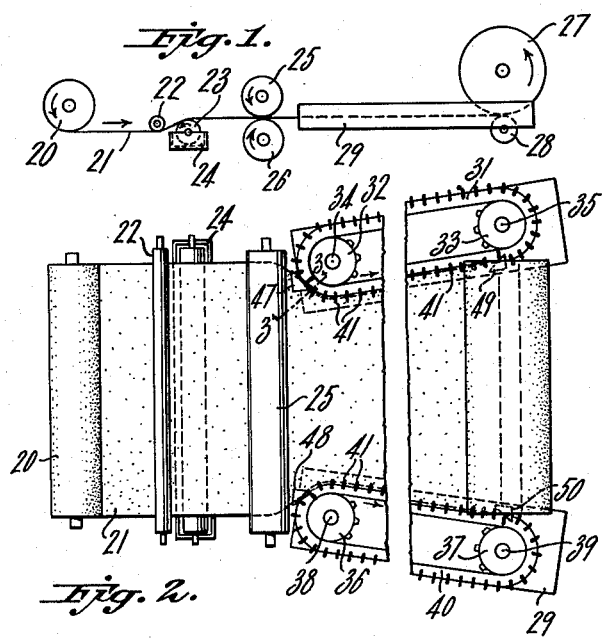
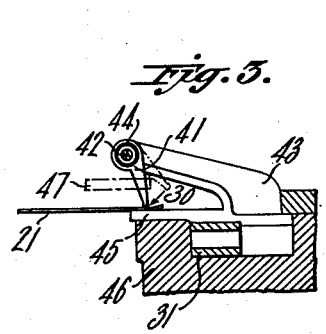
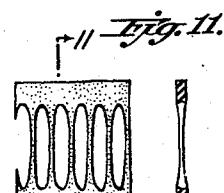
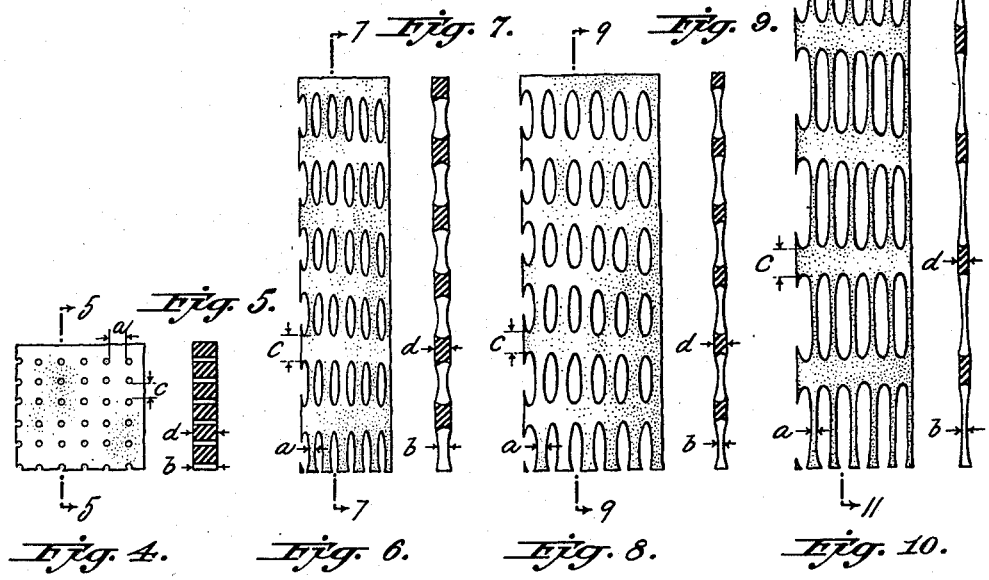
INVENTORS
EARDLEY HAZELL
HAROLD C. TINGEY
CHESTER E. LINSCOTT
BY
ATTORNEY.

Patented May 4, 1937

2,079,584

UNITED STATES PATENT OFFICE 2,079,584

RUBBER SHEET MATERIAL

Eardley Hazell, New York, N. Y., Harold C. Tingey, Nutley, and Chester E. Linscott, Ridgewood, N. J., assignors to United States Rubber Products, Inc., New York, N. Y., a corporation of Delaware Application February 29, 1936, Serial No. 66,430

13 Claims. (Cl. 18—56)

This invention relates to rubber sheet material, more particularly to perforate sheet material, especially for use in storage battery manufacture.

It has been suggested in certain designs of storage batteries to use either a mechanically perforated or slotted hard rubber sheet material, or sheet material of so-called threaded rubber, between the battery plate and the wooden or other battery plate separator which spaces the positive and negative plates. Such additional rubber separator may take the form of a sheet interposed between the battery plate, generally the positive plate only, and the plate separator, or may be in the form of a so-called envelope or envelope separator surrounding the positive plate. Such a rubber separator serves to retain the active material in the plate, and this is of especial importance in the case of heavy duty batteries subjected to vibration as in train service where the plates are required to be protected against dislodgment of active material in order to give long service. Further, where the usual plate separator is of wood, this rubber separator serves to protect the wood against the strong oxidizing action of the very active material in the positive plate. The rubber sheet material must be extremely thin in order not to excessively reduce the capacity of the battery, and the perforations or slots in the material must be small enough or narrow enough to effectively retain the active material in the plate. The sheet material, further, should be sufficiently porous so as not to materially increase the internal resistance of the cells, especially in the case of batteries for starting automobiles where excessively large currents are required during the period of cranking the engine. The limitations along these lines and the excessive cost of sheet material made by the prior art methods have severely handicapped if not completely prevented the use of such material in current storage battery practice.

The present invention relates to a method of making rubber sheet material that may be used as, among other things, an envelope or envelope separator for storage battery plates, or as a sheet separator between the battery plate and the usual battery plate separator which spaces the positive and negative plates. It further relates to a new sheet material made by such a method and particularly adapted for such storage battery uses.

The accompanying drawing illustrates one form of an apparatus for carrying out the process of the invention and several embodiments of the sheet rubber product of the invention, in which;

Figures 1 and 2 more or less diagrammatically illustrate an elevation and a plan view, respectively, of an apparatus for carrying out the process of the invention;

Figure 3 is a section on the line 3—3 of Fig. 2;

Figure 4 is a greatly enlarged view of the rubber sheet material which is used as a starting material for the present invention;

Figures 6, 8 and 10 are greatly enlarged views of three examples of rubber sheet material of the present invention made from the starting material shown in Figure 4; and Figures 5, 7, 9 and 11 are sections on lines 5—5, 7—7, 9—9 and 11—11 of Figs. 4, 6, 8 and 10 respectively.

In carrying out the present invention, there is utilized as a starting material a rubber sheet having very small perforations regularly disposed in columns and rows at an angle to one another, the columns and rows preferably extending generally lengthwise and widthwise of the sheet respectively. The perforations may be .003" to .013" in diameter and may number from upwards of 1,000 to about 10,000 per square inch. Such material may be made by the method disclosed in the patent to Linscott and Rice, No. 2,032,942, granted March 3, 1936, or by other methods which will produce a sheet having the necessary size and quantity of perforations, and the material is stretched in such a manner as to increase the percentage void area in the sheet. As will readily be seen from the detailed discussion below, the extent of the stretching to be given the sheet in one or more directions may be varied according to the shape and size of holes desired and the percentage of void area desired in the finished material. Obviously the percentage of void area will vary also with the size and density of distribution of the perforations in the initial material. The sheet is stretched in the direction of the columns of perforations and vulcanized while in stretched condition so as to retain the elongated openings produced by the stretching operation. The "columns" of perforations are considered herein to be the lines of holes in the direction of the long axes of the elongated openings in the finished sheet. As will be seen from the drawing this is generally lengthwise of the sheet, and it will be so considered in the description in this specification, but if desired, the stretching, or the greater stretching, may be widthwise of the sheet, in which case the "columns" of perforations will be considered to be widthwise of the sheet and the "rows" of perforations lengthwise. If the "columns" and "rows" run diagonally of the sheet, then the stretching, or greater stretching, will be made to take place diagonally of the sheet in the direction of the "columns" of perforations, the "columns" of perforations being considered, as usual, in the direction of the long axes of the elongated openings in the finished sheet, and the "rows" of perforations, in that case, diagonally of the sheet at substantially right angles to the "columns".

The stretching operation in the direction of the columns of perforations decreases the lateral spacing of the perforations so that adjacent elongated openings formed by the stretching operation are separated laterally by long thin strands of rubber, while the rows of openings are separated longitudinally (that is, in the direction of the columns or the direction of stretch) from adjacent rows by relatively wide bars of rubber of only slightly increased width longitudinally. When the sheet is stretched in a lengthwise direction only, and permitted free movement widthwise, there is produced at right angles to the direction of stretch, a contraction of the rubber and a resulting decrease in the width of the sheet. In order to further increase the void area of the sheet, and incidentally to make a wider material and increase the amount of finished stock, the sheet is preferably given some additional stretch widthwise, or in the direction of the rows, but greatly less in amount than the stretch in the direction of the length of the sheet or the columns of perforations, and preferably not much more than is sufficient to bring the sheet back to its original width or, in other words, merely restrain lateral contraction of the sheet. The sheet is maintained in its stretched condition in one or two directions for vulcanizing by rolling tightly around a drum, and the vulcanization is made to take place while the sheet remains so stretched and rolled. The sheet is preferably vulcanized to hard rubber when used in storage batteries as above described, but if desired, it may be vulcanized to soft rubber while maintained stretched on the roll, for battery or other uses. The matter of vulcanizing to hard rubber or soft rubber is a matter of compounding the rubber sheet with more or less sulfur as is well known in the art.

The amount of stretch that the sheet is given substantially in the direction of the columns of perforations depends on the specific starting material and the finished material which it is desired to produce. At the beginning of the stretching operation and up to the optimum stretch, an increase in the elongation of the sheet as a whole produces a relatively greater increase in the length of the openings and only a small increase in the longitudinal dimension of the wide transverse bars, and hence a substantial net increase in the percentage of void area in the sheet. It has been found, however, that beyond a certain optimum amount of stretching, the longitudinal dimension of the wide bars between the rows of openings increases at a relatively greater rate than does the length of the perforations, so that such further stretching reduces rather than further increases the percentage of void area of the sheet. For maximum void area in the sheet, therefore, the stretching in the direction of the columns should be to an extent such that further stretching in that direction would reduce instead of increase the percentage of void area in the sheet.

It has been further found that if the sheet is treated with an organic swelling agent for rubber, such as carbon tetrachloride, prior to, or during, or subsequent to the stretching operation and at least some of the swelling agent is retained by the sheet at the time of vulcanization, there will be a higher percentage of void area in the finished sheet than in the case of material which has been stretched to the same extent but not so treated with carbon tetrachloride. Such treatment, with the same amount of stretch, produces bars between the rows of elongated openings of less width and greater thickness, and thin strands laterally separating adjacent openings of less width and less thickness than without such treatment.

Referring more particularly to Figures 1 and 2, there is illustrated, more or less diagrammatically, an apparatus for carrying out the present preferred process wherein the perforate sheet starting material is stretched lengthwise and also to a slight extent widthwise, and the sheet is treated with carbon tetrachloride before vulcanizing. A roll 20 of the perforate sheet starting material 21 passes under a guide roll 22 and over a solvent applying roll 23 which dips into a tank 24 containing carbon tetrachloride. The roll 23 revolves in the opposite direction to the sheet of perforate material passing over it in order to secure even distribution and absorption of the carbon tetrachloride over the surface of the sheet. The sheet passes between nip rolls 25, 26 and is wound up on drum 27. Drum 27 rests upon roll 28 and is driven by it. Driving roll 28 rotates at a fixed speed and at a desired faster rate than nip rolls 25, 26 so that the material 21 is stretched between the nip rolls 25, 26 and the wind-up drum 27 and builds up on the drum 27 under a constant stretch ratio. In order to stretch the material widthwise a tentering frame 29 is used at the edges of the sheet between the nip rolls 25, 26 and the wind-up drum 27. The tentering frame is a conventional apparatus having a series of jaws 30, shown in detail in Fig. 3, linked together into a chain 31 which runs on sprockets 32 and 33 pivoted at 34 and 35 along one edge of the sheet and a similar series of jaws linked together into a chain 40 which runs on sprockets 36 and 37 pivoted at 38 and 39 along the opposite edge of the sheet. The chains 31 and 40 are spaced at the end adjacent the egress side of the nip rolls 25, 26 so that the sides of the material are positioned to pass through the openings in the jaws 30. Each jaw 30, as shown in Fig. 3, comprises a finger 41 pivoted at 42 on an arm 43. A spring 44 at the pivot 42 tends to press the end of the finger 41 against the jaw base 45 which is carried by the chain 31 riding in a groove in the standard 46 of the tentering frame. When the edge of the material 21 is gripped in the jaw 30, it will be seen the harder the pull of the material, the tighter it is held by the jaw. A cam 47 presses against the fingers 41 to open the jaws 30 as they come into position to grip the sheet 21 as it leaves the nip rolls 25, 26. As the fingers pass the cam surface and are released by it, the springs 44 press the fingers against the jaw bases to close the jaws for gripping the edges of the material for the stretching operation. A similar cam 48 opens the jaws on the opposite chain 40 as they come into proper position for gripping the edges of the material. The paths of the chains 31 and 40 are set at an angle to the path of travel of the material, and in this way, the material is gradually stretched. When the material has been stretched the desired amount, cams 49 and 50 similar to cams 47 and 48 open the jaws 30 to release the stretched material for rolling up on the drum 27 and after release of the material permit the springs 44 to press the fingers 41 against the jaw bases 45 to close the jaws for their idle travel between cams 49 and 50 to cams 47 and 48. The length of the drum 27 is selected so that the stretched material preferably laps over the edge of the drum a small amount, for example, a half inch in a sheet up to two feet wide, for locking the rolled up sheet widthwise and preventing creeping before or during cure. The widthwise stretching may be omitted by eliminating the tentering frame. The swelling treatment may likewise be omitted if the increased void area resulting from such treatment is not desired.

Figures 4 and 5 illustrate a specific starting material which may be transposed by the various methods of the present invention as above described into various finished materials as illustrated in Figs. 6 and 7, Figs. 8 and 9, and Figs. 10 and 11. The starting material of Figs. 4 and 5, which merely illustrates a present preferred embodiment, was made according to the process of the Linscott and Rice Patent No. 2,032,942 on a fabric blanket having about 58 warp and 58 weft threads per inch, and which was rubberized without masking the weave on the front or deposition surface, but with a continuous impervious film on the back to permit the blowing, during drying, of latex films spread on the deposition surface.

Latex of the following composition (by weight):

| | |
|---|---|
| Rubber (as twice-creamed latex of 60% solids) | 100.0 |
| Ammonia | 0.5 |
| Water | 62.5 |
| Cyclohexanol | 1.0 |
| Ammonium oleate | 1.0 |
| Water | 2.0 |
| Accelerator (mercaptobenzothiazole) | 2.0 |
| Antioxidant (N,N'-di-beta-naphthyl p-phenylenediamine) | 1.0 |
| Zinc oxide | 0.5 |
| Cyclohexanol | 1.0 |
| Ammonium oleate | 1.0 |
| Water | 21.0 |
| Sulfur | 45.0 |
| Dispersing agent ("Darvan") | 1.35 |
| Water | 27. |

Additional water to make up the whole to 54% solids was spread on the deposition surface in a layer of sufficient thickness to make a dried film 0.003″ thick, and the latex dried by passing the deposition belt through circulating air at about 230° F. The perforations were produced during drying by the expansion of small bubbles of air entrapped by the spread latex film in the pits or cavities between the threads in the deposition surface. The spreading and drying steps were repeated in this manner until a material about .022 inch thick was formed, and this had about 3200 holes per square inch, each about .005 inch in diameter as illustrated in Figures 4 and 5. As may readily be seen from the above formula, the latex was compounded to form hard rubber. While some small vulcanization of the perforate sheet starting material takes place during the drying operation, the vulcanization to the final hard rubber product to retain the sheet in the stretched condition does not take place until the heating under vulcanizing conditions after stretching. Vulcanization to hard rubber of a sheet material made from the above latex composition may be completed, for example, on heating at 315° F. for 2 hours, preferably in open steam. If desired, of course, the starting material may be compounded so that it will cure to a soft, vulcanized rubber after stretching, but for storage battery use, hard rubber is preferred.

The material of Figure 6 was produced by stretching the starting material of Figure 4 lengthwise of the sheet and permitting free retraction of the sheet widthwise so that the finished sheet was 2.8 times the original length and .7 times the original width. The material of Figure 8 was produced by stretching the starting material of Figure 4 lengthwise the same amount as the material of Figure 6 but in addition, widthwise to slightly more than the original width so that the finished material was 2.8 times the original length and 1.15 times the original width. The material of Figure 10 was produced by stretching the starting material of Figure 4 lengthwise while largely restraining widthwise or lateral contraction, and treating with carbon tetrachloride, as shown in Figures 1 and 2 of the drawing. The finished product in this case was 4.7 times the original length and .85 times the original width.

From the nature of the material and of the stretching process, it is obvious that the finished product will have rows of elongated perforations separated by bars which are not necessarily exactly parallel nor of precisely the same width, but in general a lengthwise stretching of the sheet will produce elongated perforations with the long axes lengthwise of the sheet and rows of such perforations separated longitudinally by approximately parallel bars of substantially equal width.

For some purposes it may be desired to produce a finished material in which the transverse rows of elongated openings extend more or less diagonally across the sheet,—that is, at an angle to the length of the sheet other than a right angle,— or a material in which both the columns and the rows of openings extend on the bias. In the latter case the initial perforate sheet may be prepared on a fabric blanket cut on the bias. In the former case the initial perforate sheet having columns and rows of perforations substantially lengthwise and widthwise of the sheet, may be fed to the nip rolls (25, 26) with one edge of the sheet leading the other edge, that is, with the sheet under longitudinal shearing distortion. Any such stretch lengthwise of the sheet is said to be in a "substantially" lengthwise direction or "substantially" in the direction of the columns of perforations, and any such stretch widthwise of the sheet similarly is said to be in a "substantially" widthwise direction or "substantially" in the direction of the rows of perforations.

The average dimensions of the perforations, and the average widths ($a$) and thicknesses ($b$) of the thin strands which laterally separate the perforations, and the average widths ($c$) and thicknesses ($d$) of the wide bars which longitudinally separate the rows of perforations, and the porosity of the finished products vary greatly in the different cases as may readily be seen from the following table which gives the dimensions of the starting material of Fig. 4 and of the examples of new materials of the present invention as shown in Figs. 6, 8 and 10. In the case of the stretched materials the width of the holes is measured at the point of maximum width thereof. Obviously the length of the thin strands is equal to that of the elongated perforations.

| Material | Number of holes | | | Hole dimensions | | Thin strands | | Wide bars | | Approx. void area |
|---|---|---|---|---|---|---|---|---|---|---|
| | Per in. laterally | Per in. longitudinally | Per sq. inch | Laterally | Longitudinally | Width (a) | Thickness (b) | Width (c) | Thickness (d) | |
| | | | | | | | | | | Percent |
| Fig. 4 | 57 | 57 | 3200 | .005″ | .005″ | .0125″ | .022″ | .0125″ | .022″ | 5 |
| Fig. 6 | 80 | 20 | 1600 | .005 | .030 | .007 | .010 | .020 | .014 | 18 |
| Fig. 8 | 50 | 20 | 1000 | .012 | .040 | .008 | .006 | .014 | .011 | 35 |
| Fig. 10 | 67 | 12 | 800 | .012 | .065 | .003 | .007 | .020 | .014 | 50 |

It may readily be seen that according to the process of the present invention, perforate sheet material having a void area on the order of 5 to 10% may be tranformed into perforate material having a void area of up to as high of 50%. It is noted that the thin strands which laterally separate adjacent openings in the stretched materials have been reduced in each case to the astonishingly small width of less than .01 inch. The relatively great increase in the length of the thin strands, and the relatively slight increase in the width or longitudinal dimension of the transverse bars, when the sheet is stretched to an extent not exceeding the optimum elongation, is clearly shown in the following table in which the figures express the percentage increase in elongation of the rubber in the thin strands and in the wide bars, referred to the initial length of each, respectively (lengthwise of the sheet):

| | Percentage elongation | | |
|---|---|---|---|
| | Fig. 6 | Fig. 8 | Fig. 10 |
| | Percent | Percent | Percent |
| Thin strands | 500 | 700 | 1200 |
| Wide bars | 60 | 10 | 60 |
| The sheet as a whole | 180 | 180 | 370 |

The initially greater elongation of the thin strands, as compared with the increase in longitudinal dimension of the transverse bars, produces a difference between the thickness of the strands and that of the bars, as clearly shown in Figures 7, 9 and 11, the thickness of the bars being materially greater than the thickness of the strands. The actual thickness of the thicker bars is dependent of course upon the thickness of the starting material, and the bars may readily be not more than .02 inch in thickness, which is the maximum preferred thickness for use in storage batteries as a separator material between the plates and the usual plate separator. The maximum width of the elongated openings for such use should not be greater than .015 inch, otherwise the openings will not properly retain the paste in the plate. It is preferred to have the width of the elongated openings at least equal to, and the length of the openings at least above five times greater than, the diameter of the original holes. The present invention has been described herein more particularly with respect to the manufacture of sheet material for use in storage batteries, but sheet material of soft rubber or hard rubber produced according to the present invention may have many other uses such as for screens and the like.

As various modifications will occur to those skilled in the art, it is not intended to limit the invention other than as set forth in the appended claims.

Having thus described our invention, what we claim and desire to protect by Letters Patent is:

1. The process of making a rubber sheet having a plurality of substantially parallel rows of unconnected elongated openings with adjacent openings separated laterally by thin strands of rubber and adjacent rows of said openings separated longitudinally by relatively wide transverse bars of rubber, which comprises providing a rubber sheet having perforations arranged in columns and rows at substantially right angles to one another, stretching the sheet substantially in the direction of said columns to increase the void area of the sheet, and vulcanizing the sheet while in stretched condition to retain the elongated openings produced by the stretching operation.

2. The process of making a rubber sheet having a plurality of substantially parallel rows of unconnected elongated openings with adjacent openings separated laterally by thin strands of rubber and adjacent rows of said openings separated longitudinally by relatively wide transverse bars of rubber, which comprises providing a rubber sheet having perforations arranged in columns and rows at substantially right angles to one another, stretching the sheet substantially in the direction of said columns to approximately such elongation that further stretching in said direction would reduce the void area of the sheet, and vulcanizing the sheet while in stretched condition to retain the elongated openings produced by the stretching operation.

3. The process of making a rubber sheet having a plurality of substantially parallel rows of unconnected elongated openings with adjacent openings separated laterally by thin strands of rubber and adjacent rows of said openings separated longitudinally by relatively wide transverse bars of rubber, which comprises providing a rubber sheet having columns and rows of substantially round perforations of a diameter from .003 to .013 inch, stretching the sheet at least substantially in the direction of said columns to increase the void area of the sheet, and vulcanizing the sheet in stretched condition to retain the elongated openings produced by the stretching operation.

4. The process of making a rubber sheet having a plurality of substantially parallel rows of unconnected elongated openings with adjacent openings separated laterally by thin strands of rubber and adjacent rows of said openings separated longitudinally by relatively wide transverse bars of rubber, which comprises providing a rubber sheet having columns and rows of perforations at substantially right angles to one another, stretching the sheet substantially in the direction of said columns and also to a lesser extent in a transverse direction to increase the void area of the sheet, and vulcanizing the sheet while in stretched condition to retain the elongated openings produced by the stretching operation.

5. The process of making a rubber sheet having a plurality of substantially parallel rows of unconnected elongated openings with adjacent openings separated laterally by thin strands of rubber and adjacent rows of said openings separated longitudinally by relatively wide transverse bars of rubber, which comprises providing a rubber sheet having columns and rows of perforations at substantially right angles to one another, stretching the sheet substantially in the direction of said columns while substantially restraining lateral contraction of the sheet, and vulcanizing the sheet while in stretched condition to retain the elongated openings produced by the stretching operation.

6. The process of making a rubber sheet having a plurality of substantially parallel rows of unconnected elongated openings with adjacent openings separated laterally by thin strands of rubber and adjacent rows of said openings separated longitudinally by relatively wide transverse bars of rubber, which comprises providing a rubber sheet having columns and rows of perforations at substantially right angles to one another, treating the sheet with a swelling agent for rubber, stretching the sheet at least substantially in the direction of said columns, and vulcanizing the sheet while in stretched condition and while retaining at least some of the swelling agent to retain the elongated openings produced by the stretching operation.

7. The process of making a rubber sheet having a plurality of substantially parallel rows of unconnected elongated openings with adjacent openings separated laterally by thin strands of rubber and adjacent rows of said openings separated longitudinally by relatively wide transverse bars of rubber which comprises providing a rubber sheet having columns and rows of perforations at substantially right angles to one another, treating the sheet with carbon tetrachloride, stretching the sheet at least substantially in the direction of said columns, and vulcanizing the sheet while in stretched condition and while retaining at least some of the carbon tetrachloride to retain the elongated openings produced by the stretching operation.

8. Sheet material composed of vulcanized rubber and having a multiplicity of unconnected elongated openings, adjacent openings being separated laterally by thin strands of rubber not greater than .01 inch in width.

9. Sheet material composed of vulcanized rubber and having a multiplicity of unconnected elongated openings not greater than .015 inch in width, adjacent openings being separated laterally by thin strands of rubber not greater than .01 inch in width.

10. Vulcanized rubber sheet material having a plurality of substantially parallel rows of unconnected elongated openings, adjacent openings being separated laterally by thin strands of rubber not more than .01 inch in width, and rows of said openings being separated longitudinally from adjacent rows by bars of rubber which are wider than the width of said thin strands.

11. Vulcanized rubber sheet material having a plurality of substantially parallel rows of unconnected elongated openings, adjacent openings being separated laterally by thin strands of rubber not more than .01 inch in width, and rows of said openings being separated longitudinally from adjacent rows by bars of rubber which are wider than the width of said thin strands, but which are less in width than the length of said openings.

12. Vulcanized rubber sheet material having a plurality of substantially parallel rows of unconnected elongated openings, adjacent openings being separated laterally by thin strands of rubber not more than .01 inch in width, and rows of said openings being separated longitudinally from adjacent rows by bars of rubber which are wider than the width of said thin strands, the thickness of said bars being greater than the thickness of said strands.

13. Vulcanized rubber sheet material having a plurality of substantially parallel rows of unconnected elongated openings adjacent openings being separated laterally by thin strands of rubber not more than .01 inch in width, and rows of said openings being separated longitudinally from adjacent rows by bars of rubber which are wider than the width of said strands, and less in width than the length of the openings, but which are greater in thickness than the thickness of said strands.

EARDLEY HAZELL.
HAROLD C. TINGEY.
CHESTER E. LINSCOTT.